United States Patent [19]

Onishi et al.

[11] 4,037,715

[45] July 26, 1977

[54] CHAIN CONVEYER SYSTEM

[75] Inventors: Katsuya Onishi; Katsuyoshi Yoshida, both of Akashi, Japan

[73] Assignee: Yamato Scale Company, Japan

[21] Appl. No.: 663,668

[22] Filed: Mar. 4, 1976

[30] Foreign Application Priority Data

Apr. 18, 1975 Japan .................................. 50-48052

[51] Int. Cl.² ........................................... B65G 17/12
[52] U.S. Cl. .................................... 198/800; 198/799
[58] Field of Search .............. 198/150, 151, 154, 157, 198/158, 799, 800

[56] References Cited

U.S. PATENT DOCUMENTS

| 483,617 | 10/1892 | Knapp | 198/154 X |
|---|---|---|---|
| 864,438 | 8/1907 | Szczys | 198/158 X |
| 1,423,765 | 7/1922 | Hastings | 198/154 |
| 2,114,928 | 4/1938 | Kucera | 198/151 X |
| 2,190,783 | 2/1940 | Hardy | 198/154 |
| 2,242,813 | 5/1941 | Cook | 198/154 X |
| 3,462,003 | 8/1969 | Mencacci et al. | 198/151 |

FOREIGN PATENT DOCUMENTS

| 961,423 | 5/1950 | France | 198/158 |
|---|---|---|---|
| 325,571 | 2/1930 | United Kingdom | 198/158 |

Primary Examiner—Evon C. Blunk
Assistant Examiner—Richard K. Thomson
Attorney, Agent, or Firm—Eugene E. Geoffrey, Jr.

[57] ABSTRACT

A chain conveyor which includes a main chain and an auxiliary chain having the same pitch and total length, a plurality of carriages each having a shaft extending through midway points of links on the main chain and rotatable relative thereto, arms coupling a pivot of each main chain with a pivot on the auxiliary chain and arms coupling each carriage shaft to a midway point of a link on the auxiliary chain. With such an arrangement the carriages will all maintain a predetermined angular relationship notwithstanding the movement of the chain through various paths in a vertical plane.

1 Claim, 4 Drawing Figures

CHAIN CONVEYER SYSTEM

This invention relates to an improved chain conveyor system used for transporting articles successively so that the articles are always maintained at a predetermined inclination with respect to the horizontal plane.

A typical example of a prior conveyor system used for attaining the same function is the suspension type in which the carriages are simply hung from a moving chain or rope. However such a suspension type conveyor system cannot avoid free swinging motion of the carriages and, therefore, cannot always keep the articles being transported perfectly horizontal. For this reason, the suspension type does not completely meet the requirements of the packaged food industry especailly in the handling of fluid foods. In the suspension type system, moreover, the vertical dimension of each carriage is generally large due to provision of relatively long suspension arms and, accordingly, the interval of the adjoining carriages must be relatively large in order to prevent mutual interference. This results disadvantageously in a need for a large space for installation and unnecessary magnification of co-operating equipment such as processing chambers and immersion baths.

Accordingly, an object of this invention is to provide an improved chain conveyor system having carriages for carrying articles, which not only have a relatively small vertical dimension and short interval but also can keep articles perfectly horizontal or at a constant inclination to the horizontal plane regardless of how meandering the passage of the conveyor may be.

This object can be fully attained by the chain conveyor system of this invention, which includes a main roller chain stretched and driven along a predetermined transportation path, an auxiliary roller chain having the same pitch and total length as said main roller chain and arranged in substantially parallel and side-by-side relationship with said main roller chain, chain coupling inks of equal length respectively coupling the roller shafts of said main roller chain to the roller shafts of said auxiliary roller chain, carriage supporting shafts respectively penetrating the links of said main roller chain rotatably at their midway points in the direction of said roller shafts and supporting carriages fixed thereto on the side opposing said auxiliary roller chain, coupling arms having the same length as said chain coupling links each having one end fixed to a carriage supporting shaft on the side of said auxiliary roller chain and the other end pivoted at a midway point of a link of said auxiliary roller chain, whereby said chain coupling links and coupling arms are maintained in parallel orientation throughout the system, and at least one guide in contact with the rollers of said auxiliary roller chain to control the path of said auxiliary roller chain and to maintain said chain coupling links at a predetermined angle with respect to the horizontal plane.

Other features and operation of this invention will be described in detail hereinunder with reference to the accompanying drawings.

In the drawings.

Throughout the drawings, like reference numerals are used to denote like structural components.

Figure 1:
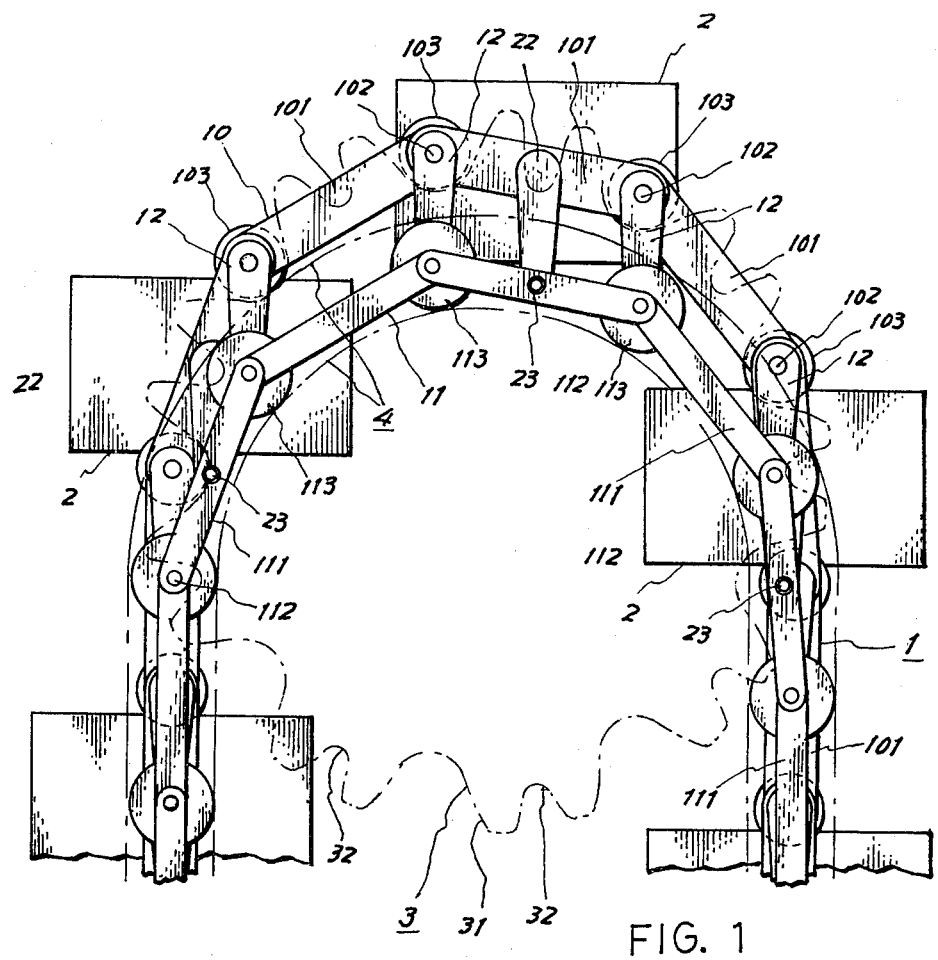
FIG. 1 is a partial side view representing an embodiment of the conveyor system of this invention at a turning point.
Figure 3:
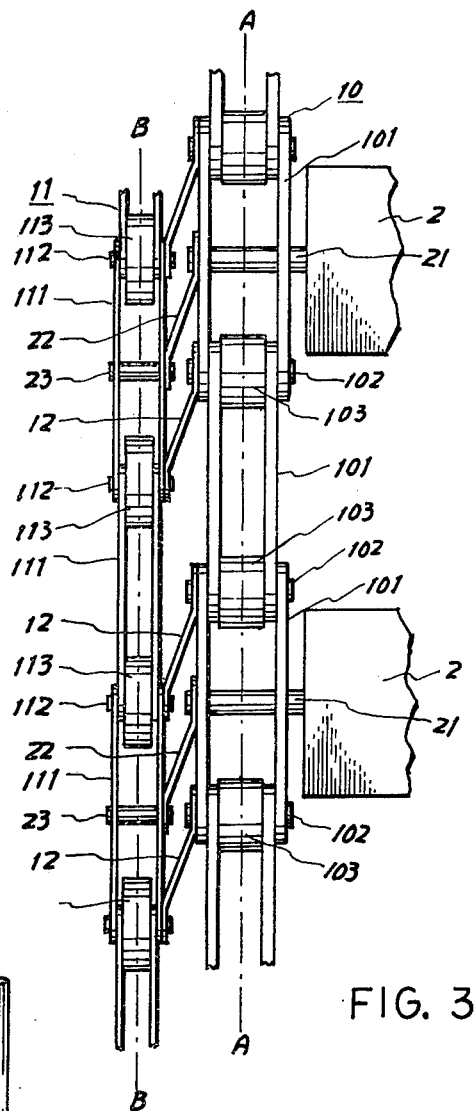
FIG. 3 is a partial front view of the embodiment of FIG. 1 in a straight path.
Figure 2:
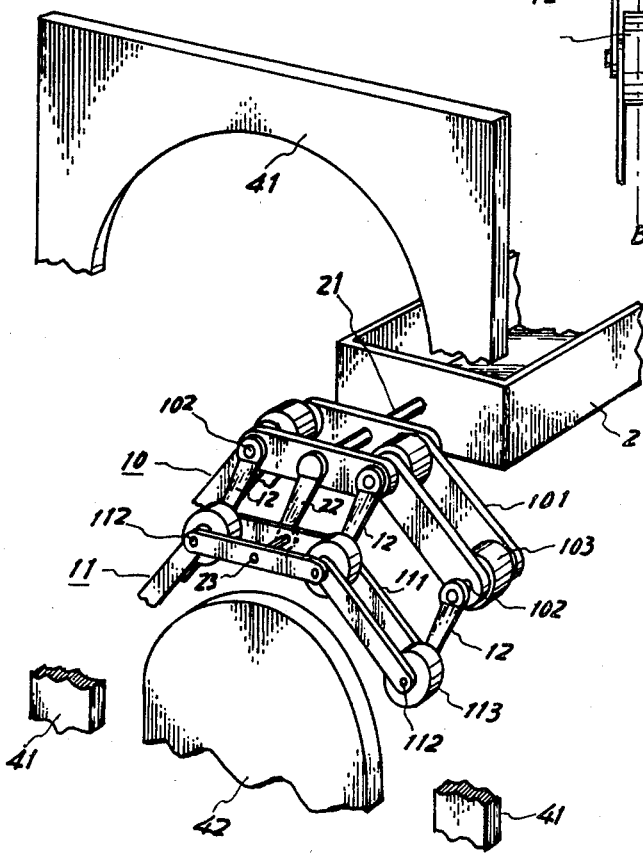
FIG. 2 is an exploded perspective view of a fragmentary portion of the embodiment of FIG. 1.

Referring to FIGS. 1, 2 and 3, the chain conveyor system according to this invention comprises an endless conveyor chain 1, a plurality of article carriages 2 supported by the conveyor chain 1 as described later, at least one sprocket wheel 3 for driving the conveyor chain 1 and a guide 4 for guiding the chain 1 along the predetermined path.

The conveyor chain 1 of this invention comprises a main roller chain 10, an auxiliary roller chain 11 having the same length as the main roller chain 10 and being arranged in side by side relationship therewith and a plurality of chain coupling links 12 for coupling both chains 10 and 11. As shown in FIG. 3, the main roller chain 10 and the auxiliary roller chain 11 are arranged respectively in two different planes A and B which are parallel with each other at a predetermined small distance and guided respectively by different sprocket wheels 3 and/or guides 4.

The main roller chain 10 consists of a plurality of links 101, link coupling shafts 102 and rollers 103 pivoted on the shafts 102, and the auxiliary roller chain 11 consists of a plurality of links 111, link coupling shafts 112 and rollers 113 pivoted on the shafts 112. The links 111 have the same length and number as the links 101 and, accordingly, the roller chains 10 and 11 have the same length. The coupling shafts 102 and 112 of both chains 10 and 11 are respectively coupled through the chain coupling links 12 of equal length into a single endless conveyor chain 1.

In a midway position of every other link 101 of the main roller chain 10, a carriage supporting shaft 21 penetrates rotatably through the link 101 in the direction parallel to the link coupling shafts 102 and an article carriage 2 is fixed thereto on the side opposing the auxiliary roller chain 11. On the side facing the auxiliary roller chain 11, the carriage supporting shaft 21 is fixed to an end of a coupling arm 22 having the same length as the chain coupling links 12 and the other end of the coupling arm is pivoted by a coupling pin 23 penetrating the corresponding link 111 of the auxiliary roller chain 11 in a corresponding midway position thereof. The coupling arms 22 and the chain coupling links 12 are preferably bent in Z-shape, as shown in FIG. 3, in order to prevent mutual interference between the chains 10 and 11 and between the links 12 and arms 22.

Although in the drawings only a single conveyor chain is shown, it should be noted that, in general practice, a pair of such conveyor chains are arranged in parallel and in back to back relationship and the carriage supporting shafts with the carriages 2 are respectively supported between the two conveyor chains 1 which are driven at the same speed.

As shown in FIG. 1, the main roller chain 10 is driven by a chain sprocket wheel 3, shown in broken outline, having teeth 31 meshing with the chain 10 and having a notch 32 for the carriage supporting shaft 21 respectively. While the rollers 103 of the main roller chain 10 are transferred by the teeth 31 of the sprocket wheel 3, the rollers 113 of the auxiliary roller chain 11 are guided along the path of the guide 4 composed of an outer guide plate 41 and an inner guide plate 42 as shown in FIGS. 1 and 2. For simplification of the drawing, the contours of the sprocket wheel 3 and the guide 4 are shown in broken lines.

As the links 101 and 111 of the two roller chains 10 and 11 have the same effective length and the chain coupling links 21 and the coupling arms 22 have also the same effective length, these members form various parallelograms having one side in common and therfore the common sides, that is, the links 12 and arms 22 are all parallel to each other. In other words, the orientation of the links 12 and arms 22 is always maintained constant and this orientation is determined by the relative position of the sprocket wheel 3 and the guide 4. As the article carriages 2 are fixed to their supporting shafts 21 which are respectively fixed to the coupling arms 22, the parallel translation of the arms 22 results in parallel translation of the carriages 2.

Theoretically speaking, this parallel translation condition is absolutely preserved however hard the conveyor chain 1 meanders, if the relative positions of both roller chains 10 and 11 are fixed by the sprocket wheel 3 and the chain guide 4 at a specific position on the path. However, it is of course desirable to provide some driving sprocket wheels and chain guides in the conveyor path to ensure the parallelism of the carriages 2. In a large capacity conveyor system, generally the sprocket wheels are provided at all turning points of the main roller chain 10 and the chain guide is provided throughout the path of the auxiliary roller chain 11. According to circumstances, however, some of the sprocket wheels may be substituted by plain guide rollers or even guide plates and the chain guide may be omitted in straight portions of the path. In some cases, moreover, not only the guide 4 for the auxiliary roller chain 11 of either of the conveyor chains 1 arranged on both sides of the carriages 2, but also the auxiliary roller chain 11 of this side, may be omitted. In the latter case, of course, the chain coupling links 12 and the coupling arms 22 on that side are omitted too.

As described above, the chain conveyor system of this invention has novel and improved features not only that the article carriages 2 can maintain their horizontal positions or inclinations perfectly throughout the meandering path of the chain conveyor 1 but also that the carriages 2 can be arranged at much less pitch than in the prior suspension type systems due to the substantial reduction of the carrier dimension.

Figure 4:
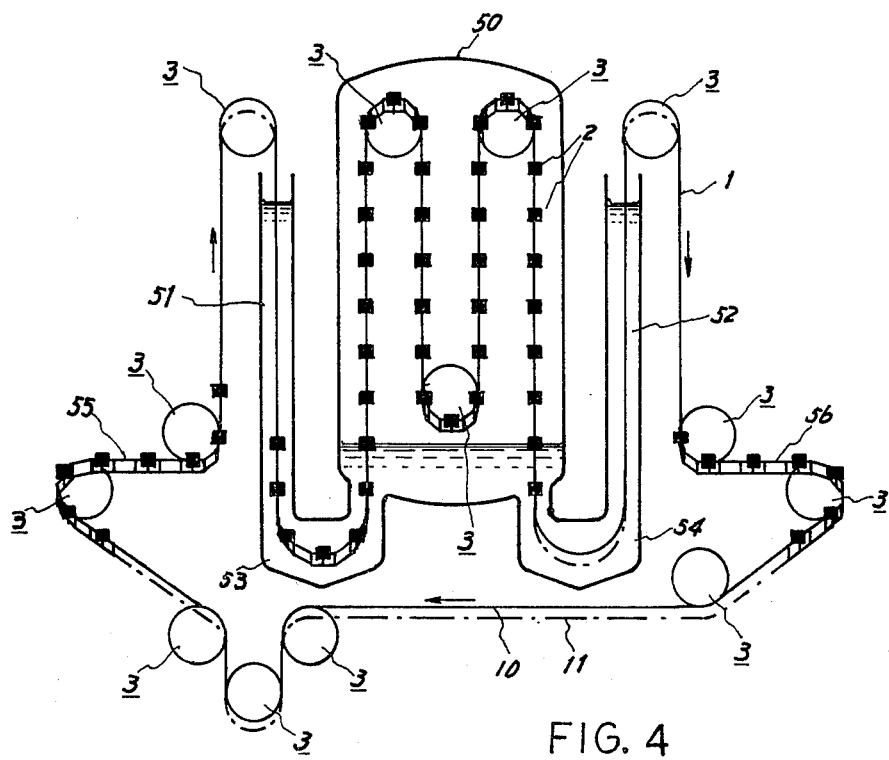
FIG. 4 is a schematic sectional side view of a device utilizing the chain conveyor system of this invention for transporting articles to be processed therein.

Because of the above advantages, the conveyor system of this invention is utilized widely. FIG. 4 represents a preferred embodiment of this invention adopted in a continuous sterilization device for packaged foods. Even if packed or canned food are rotated or tilted, there will be no change in appearance. However, in the case of packaged foods which include fluid material, there will be substantial change in appearance, such as deformation of package. This embodiment is especially useful for processing such packaged foods containing fluids.

In the drawing, numeral 50 denotes a sterilizing tank filled with hot water vapor or steam. In order to shut off the steam from the outside, the tank 50 is provided with a pair of U-shaped water columns 51 and 52 which are balanced with the steam pressure in the tank 50. An endless conveyor chain 1 including a main roller chain 10 and an auxiliary roller chain 11 is arranged throughout the device using 13 sprocket wheels 3 and some chain guides (not shown). A number of carriages 2 are carried by the conveyor chain 1 at proper intervals though some of them are omitted from the drawing for simplification. Although the spocket wheels are provided at most of the turning points of the conveyor chain 1, no sprocket wheel is provided at the bottom portions 53 and 54 of the water columns 51 and 52. Instead of the sprocket wheels, chain guides (not shown) are provided for the main roller chain 10 in these positions.

The packaged foods to be sterilized are loaded in the carriages 2 at a loading section 55 and transported through the water column 51 into the tank 50 in which they are sterilized by the hot steam. The sterilized products are then transported by the conveyor chain 1 through the water column 52 out of the tank 50 and unloaded at an unloading section 56.

When such sterlization device is constructed by use of the prior suspension type conveyor system, the device is very large and occupies a very large space for installation. According to the system of this invention, however, not only is there no danger of swing of carriage, but also the whole dimension of the device can be remarkably reduced without reduction of efficiency since the carriage intervals are substantially reduced.

What is claimed is:

1. A chain conveyor system, comprising a main roller chain stretched and driven along a predetermined transportation path, an auxiliary roller chain having the same pitch and same total length as said main roller chain and arranged in side by side relationship with said main roller chain and in a plane which is parallel to the plane in which said main roller chain is arranged, chain coupling links of equal effective length respectively coupling the roller shafts of said main roller chain to the roller shafts of said auxiliary roller chain, carriage supporting shafts respectively penetrating the links of said main roller chain rotatably at their midway points in the direction of said roller shafts and supporting carriages fixed thereto on the side opposite to the side of said auxiliary roller chain, coupling arms having the same effective length as said chain coupling links, one end of each of said coupling arms being fixed to said carriage supporting shafts respectively on the side of said auxiliary roller chain and the other end being pivoted at a midway point of a link of said auxiliary roller chain, whereby said chain coupling links and coupling arms maintain a parallel orientation throughout the system, and inner and outer chain guides in contact with rollers of said auxiliary roller chain to control the path of said auxiliary roller chain and to maintain said chain coupling links at a predetermined angle with respect to the horizontal plane.

* * * * *